(12) United States Patent  (10) Patent No.: US 9,305,202 B2
Lin                       (45) Date of Patent:     Apr. 5, 2016

(54) PORTABLE DEVICE HAVING FINGERPRINT RECOGNITION FUNCTION

(71) Applicant: SunASIC Technologies, Inc., New Taipei (TW)

(72) Inventor: Chi-Chou Lin, New Taipei (TW)

(73) Assignee: Sunasic Technologies Inc., New Taipei (TW)

( * ) Notice: Subject to any disclaimer, the term of this patent is extended or adjusted under 35 U.S.C. 154(b) by 71 days.

(21) Appl. No.: 13/845,237

(22) Filed: Mar. 18, 2013

(65) Prior Publication Data

US 2014/0270418 A1    Sep. 18, 2014

(51) Int. Cl.
*G06K 9/00* (2006.01)

(52) U.S. Cl.
CPC .................. *G06K 9/00053* (2013.01)

(58) Field of Classification Search
None
See application file for complete search history.

(56) References Cited

U.S. PATENT DOCUMENTS

| | | | | |
|---|---|---|---|---|
| 3,831,552 | A * | 8/1974 | Schmidt et al. | 118/31.5 |
| 6,213,403 | B1 * | 4/2001 | Bates, III | G06K 19/0718 235/486 |
| 6,628,814 | B1 * | 9/2003 | Shapiro | G06K 9/00013 235/380 |
| 6,804,382 | B1 * | 10/2004 | Dickinson | G06F 21/32 340/5.31 |
| 7,010,145 | B1 * | 3/2006 | Haruki | G06F 1/1632 382/115 |
| 7,515,252 | B2 * | 4/2009 | Hernandez | 356/71 |
| 7,812,936 | B2 * | 10/2010 | Fenrich | G06K 9/00046 356/71 |
| 8,331,096 | B2 * | 12/2012 | Garcia | 361/740 |
| 2004/0252867 | A1 * | 12/2004 | Lan et al. | 382/124 |
| 2010/0039225 | A1 * | 2/2010 | Yu et al. | 340/5.83 |
| 2011/0286639 | A1 * | 11/2011 | Ramrattan et al. | 382/124 |
| 2012/0107614 | A1 * | 5/2012 | Blum et al. | 428/411.1 |
| 2012/0268241 | A1 * | 10/2012 | Hanna et al. | 340/5.52 |
| 2013/0162799 | A1 * | 6/2013 | Hanna et al. | 348/78 |

\* cited by examiner

*Primary Examiner* — Nancy Bitar
(74) *Attorney, Agent, or Firm* — Che-Yang Chen; Law Office of Michael Chen

(57) ABSTRACT

A portable device having fingerprint recognition function includes an image sensing unit, a microprocessor, a signal transmitting unit, a carrying member, a cleaning unit, and a housing. It is characterized that the cleaning unit removes residual fingerprint from the image sensing unit while the carrying member moves in and out of the housing. The portable device of the present invention is free from fingerprint residue and can reduce security risks.

9 Claims, 6 Drawing Sheets

PORTABLE DEVICE HAVING FINGERPRINT RECOGNITION FUNCTION

FIELD OF THE INVENTION

The present invention relates to a portable device. More particularly, the present invention relates to a portable device which has fingerprint recognition function.

BACKGROUND OF THE INVENTION

Fingerprint recognition or fingerprint authentication refers to the automated method of verifying a match between two human fingerprints. Fingerprint readers (or modules) are commonly used devices to meet such requirement. Fingerprints are one of many forms of biometrics used to identify individuals and verify their identity. There are two major classes of algorithms (minutia and pattern) and four sensor designs (optical, ultrasonic, passive capacitance, and active capacitance) wildly used in fingerprint readers or modules.

There are two inexpensive fingerprint readers having been developed and grown fast in recent years. One is the optical scanner. It utilizes a Charge-Coupled Devices (CCD) or CMOS Image Sensor (CIS) to digitize fingerprints on the fingertip. The other is the capacitance-measuring type, usually made as semiconductor chips, fingerprint reader. It uses tiny capacitors to sense the fingerprint pattern on the fingertip. Both the two devices mentioned above capture fingerprint images for software algorithms to analyze geometric patterns of the feature points, for example, the ridges and grooves of each finger. Then, a comparison between the captured image and those from the fingerprint of the legal login user can be performed.

All the types of fingerprint reader may suffer the fingerprint residue problem, which may reduce the performance of the fingerprint recognition algorithm, or even endanger security.

A fingerprint reader can be a personal device and used by a single user. For example, a fingerprint reader on a notebook computer replaces the password entry method to initiate operation system by a registered fingerprint image. A fingerprint reader can also be used by a group of people. For instance, a fingerprint reader in an access control system allows entrance of specified staffs of a company by identifying their fingerprints. For the later case, if a user has a greasy finger, the fingerprint residual left on the fingerprint reader will reduce the image quality of the captured fingerprint and then affect the accuracy of the system. More importantly, for the portable fingerprint devices, the fingerprint residual left on the image sensing surface means a high security risk, because the fingerprint image can be recovered from the fingerprint residue with known retrieval techniques.

There are different ways to eliminate residual of fingerprints. For example, please refer to FIG. 1 which discloses an optical fingerprint imaging system of U.S. Pat. No. 7,515,252. It includes an optically transparent platen 1 and a protective film 2 removably attached to the platen 1 with an adhesive 3. The protective film 2 protects the platen 1 from scratches, pits, containment, and other surface damage and is substantially chemically inert to petroleum-based substances which may come into contact when receiving a finger 4 pressed to take a fingerprint image. The adhesive 3 has a selected cohesive strength that allows the protective film 2 and adhesive 3 to be removed from the platen 1 without leaving behind an adhesive residue. The protective film 2 can be replaced periodically as part of maintenance of the platen 1 to allow continued acquisition of accurate fingerprint images. Although residual of fingerprints may be eliminated by the aforementioned method, it requires the transparent platen and the protective film which cause inconvenience in use and extra cost for fingerprint recognition.

Fingerprint residual can also be eliminated by use of lipolytic enzymes. For example, please refer to FIG. 2. It discloses a substrate 5 surface having self-cleaning function by forming an anti-fingerprint film 6 with a porous structure thereon. When the porous structure including a lipolytic enzyme is formed on the surface of the substrate 5, contaminants 7 decomposed by an enzyme are absorbed into a pore, and thus detectable contamination 7 from a surface of the substrate 5 can be removed by the anti-fingerprint film 6. By this way, contamination or fingerprint residuals on the surface of a display device or electronic device can be effectively reduced. However, the porous structure may not be strong enough to bear friction of the finger after many times of use.

Therefore, a portable device having fingerprint recognition function and is free from residual fingerprint is desperately desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a portable device having fingerprint recognition function includes an image sensing unit for capturing fingerprint images of a finger; a microprocessor, linked to the image sensing unit, for recording the fingerprint image of the finger, identifying the fingerprint image of the finger from a fingerprint database, receiving a command signal and transmitting a response signal; a signal transmitting unit, connected to the microprocessor, for transmitting the command signal and the response signal between the microprocessor and a command device separated from the portable device; a carrying member for carrying the image sensing unit, the microprocessor, and the signal transmitting unit; and a housing, having a cleaning unit, for confining the carrying member to move partially in and out of the housing. The cleaning unit removes residual fingerprint from the image sensing unit while the carrying member moves in and out of the housing.

Preferably, the portable device further includes a memory unit, linked to the microprocessor, for storing the fingerprint database.

Preferably, the cleaning unit is a cloth, soft blade or brush.

Preferably, the command device includes a software for sending the command signal for the microprocessor to execute specified functions.

Preferably, the command device is a notebook computer, a desktop computer, a mobile phone, or fingerprint secured door look.

Preferably, the signal transmitting unit is a USB port or a wireless communication device such as a 2.4 Ghz or Bluetooth transmitting module.

Preferably, the response signal is a response of the command signal.

Preferably, the response signal includes a message that indicates whether the fingerprint image of the finger match a corresponding fingerprint record stored in the fingerprint database or not.

Preferably, the housing includes a first opening for exposing the image sensing unit while the carrying member is pushed out of the housing.

Preferably, the housing includes a second opening for the signal transmitting unit to be pushed out of the housing.

DETAILED DESCRIPTION OF THE PREFERRED EMBODIMENT

The present invention will now be described more specifically with reference to the following embodiment.

Figure 1:
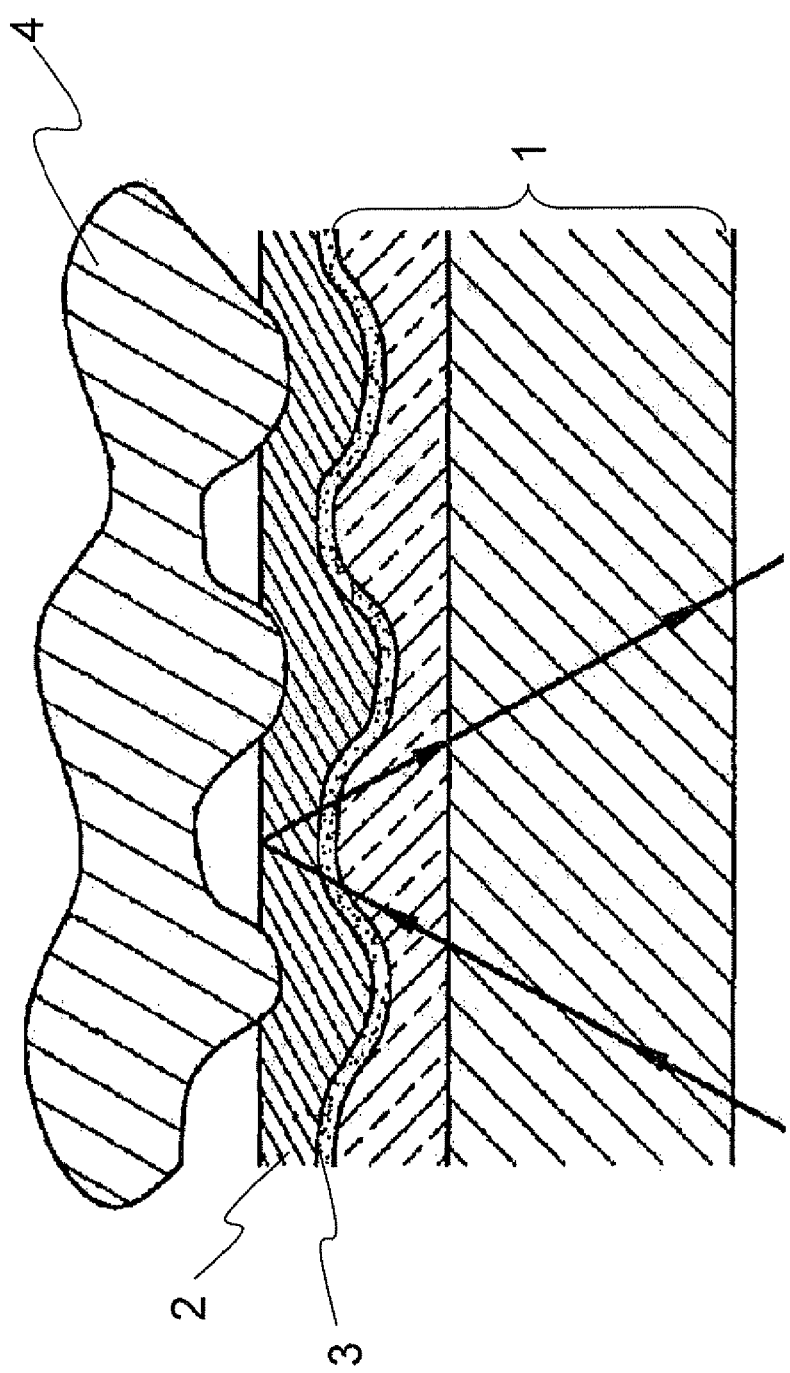
FIG. 1 shows an optical fingerprint imaging system of a prior art.
Figure 2:
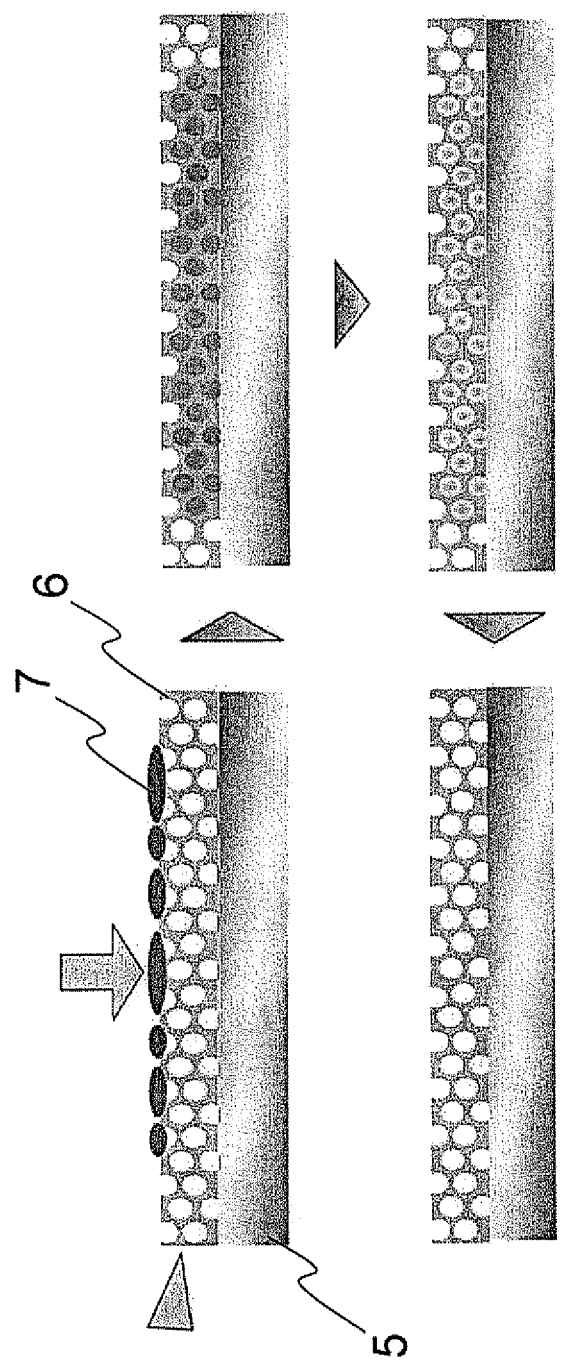
FIG. 2 shows a porous anti-fingerprint film of another prior art.
Figure 3:
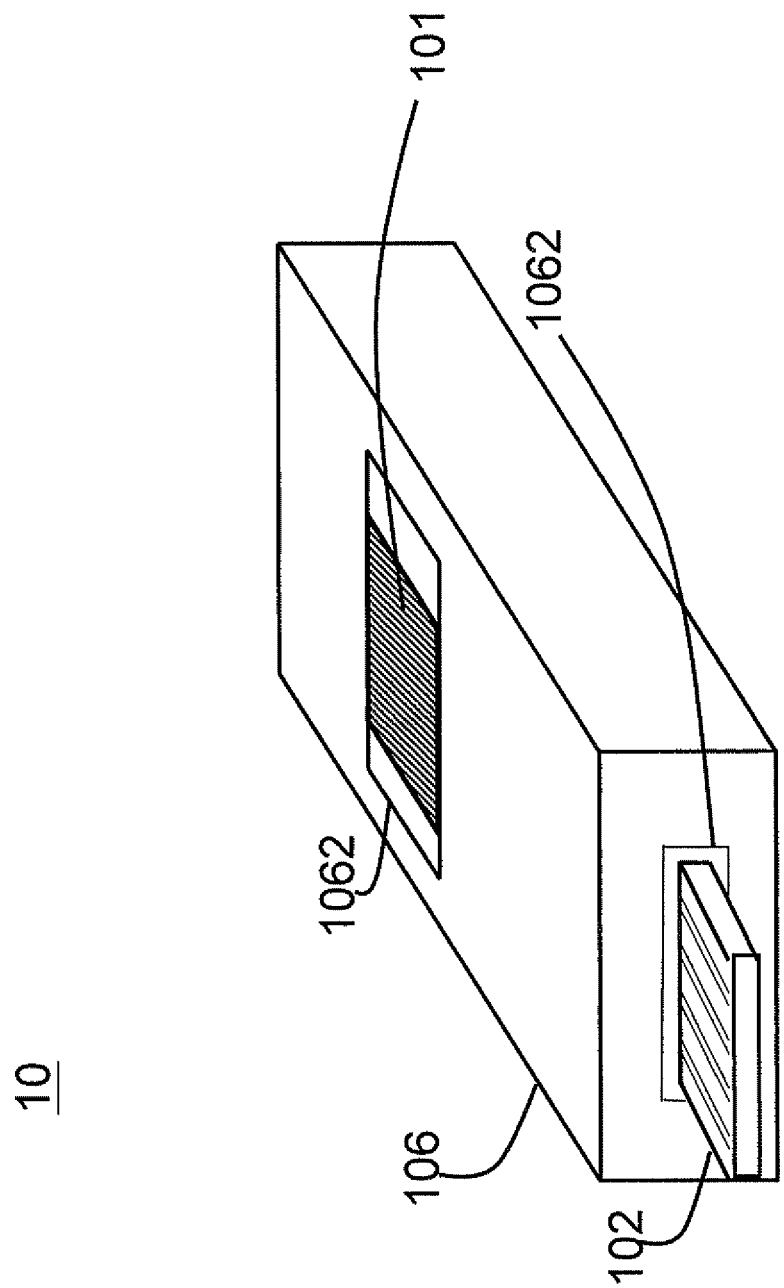
FIG. 3 shows a portable fingerprint device according to an embodiment of the present invention.
Figure 4:
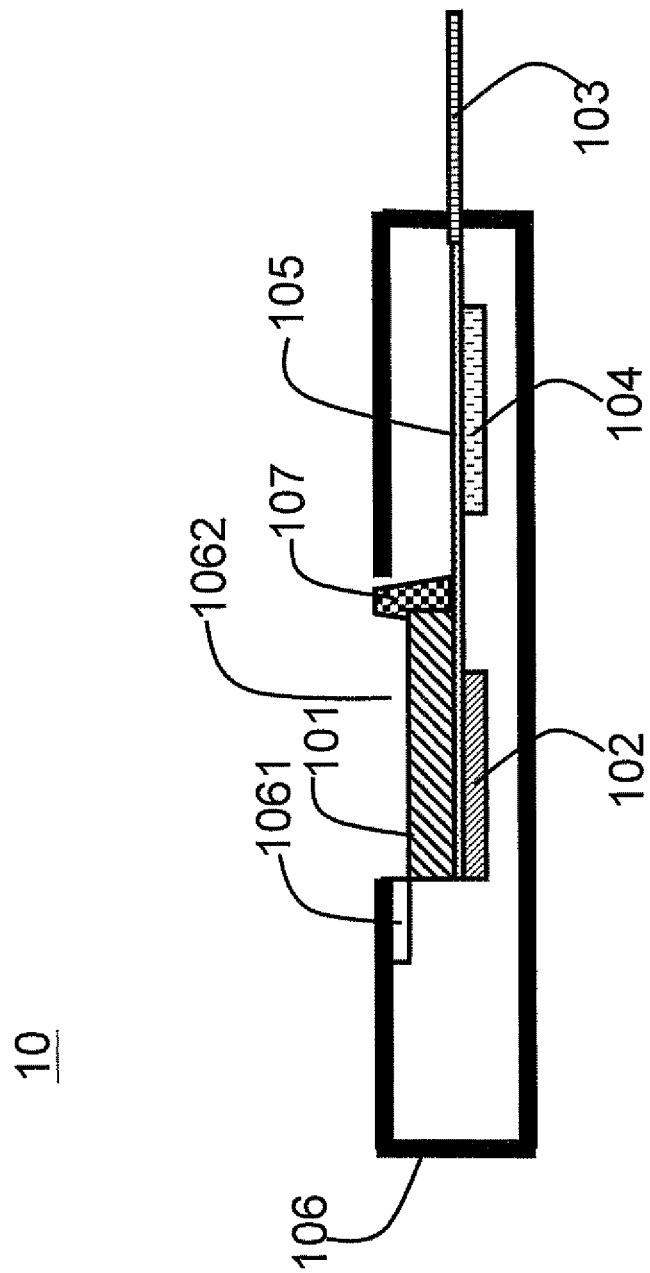
FIG. 4 illustrates a cross-sectional view of the portable fingerprint device of the present invention.
Figure 5:
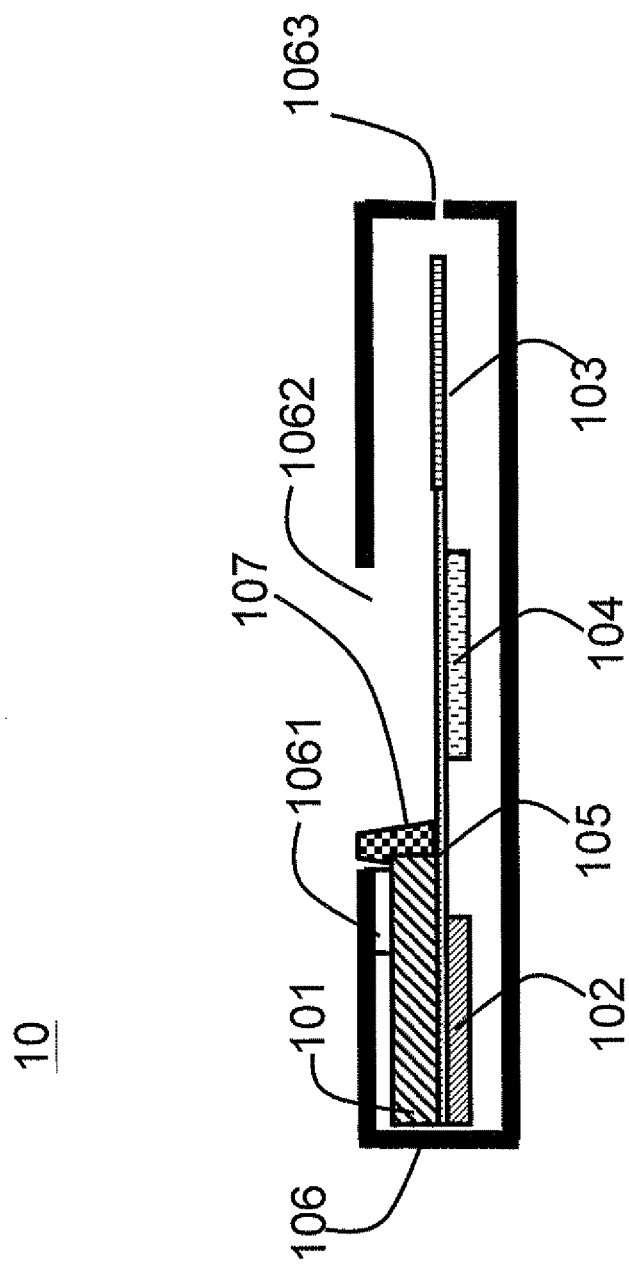
FIG. 5 shows another cross-sectional view of the portable fingerprint device of the present invention.
Figure 6:
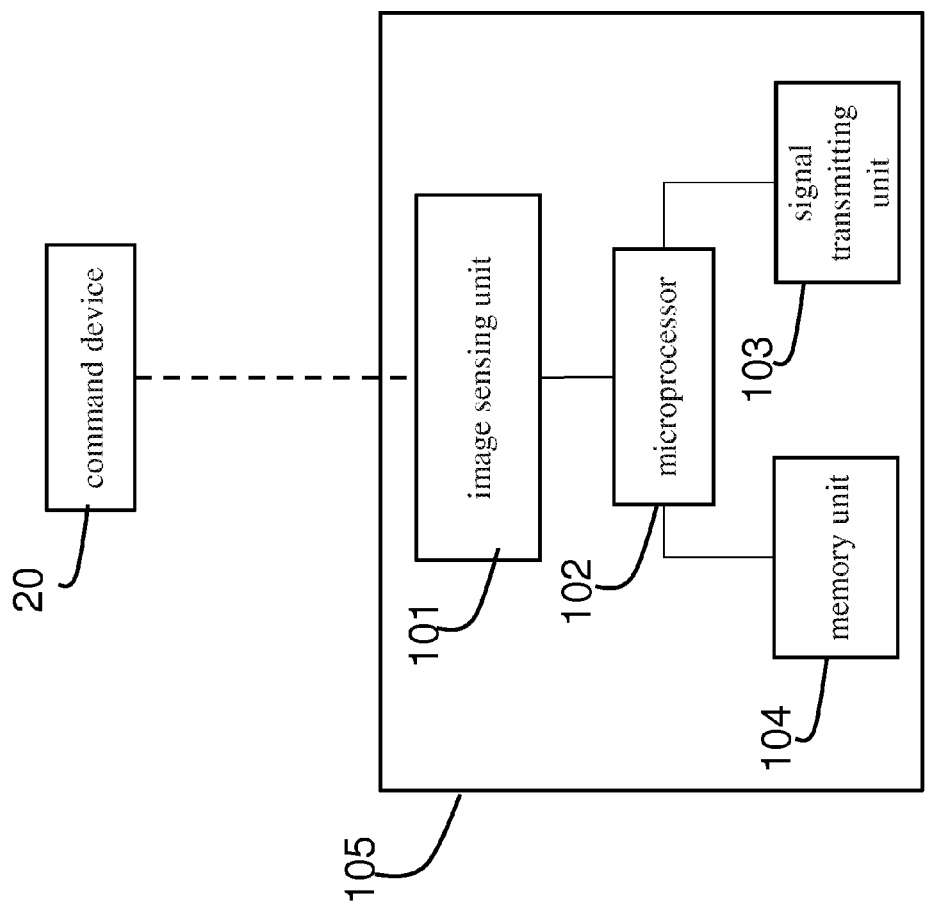
FIG. 6 illustrates a schematic block diagram of the portable fingerprint device of the present invention.

Please refer to FIG. 3 to FIG. 6. FIG. 3 shows a portable fingerprint device according to an embodiment of the present invention. FIG. 4 illustrates a cross-sectional view of the portable fingerprint device. FIG. 5 shows another cross-sectional view of the portable fingerprint device. FIG. 6 illustrates a schematic block diagram of the portable fingerprint device.

As shown in FIG. 6, a portable fingerprint device 10 which has fingerprint recognition function includes an image sensing unit 101, a microprocessor 102, a signal transmitting unit 103, a memory unit 104, a carrying member 105 and a housing 106. The image sensing unit 101 is used for capturing fingerprint images of a finger. In this embodiment, the image sensing unit 101 is a capacitance-measuring type fingerprint reader. The microprocessor 102 is linked to the image sensing unit 101. The microprocessor 102 can record the fingerprint image of the finger, identify the fingerprint image of the finger from a fingerprint database, receive a command signal and transmit a response signal.

The signal transmitting unit 103 is connected to the microprocessor 102 and can transmit the command signal and the response signal between the microprocessor 102 and a command device 20. The command device 20 is separated from the portable fingerprint device 10. The connection is presented by a dashed line shown in FIG. 6. In the present embodiment, the signal transmitting unit 103 is a USB male connector. The memory unit 104 is linked to or embedded within the microprocessor 102. The memory unit 104 stores the fingerprint database. The carrying member 105 carries the image sensing unit 101, the microprocessor 102, the signal transmitting unit 103 and the memory unit 104 if not embedded within the microprocessor 102. Please refer to FIG. 4 and FIG. 5. By using a pushing bar 107, the carrying member 105 can move partially in and out of the housing 106. In this way, the signal transmitting unit 103 can protrude out of the housing 106 when the portable fingerprint device 10 needs to connect to the command device 102, and stow back in the housing 106 when the portable fingerprint device 10 is not used and needs protection of the housing 106.

The housing 106 is used to enclose and protect the image sensing unit 101, the microprocessor 102, the signal transmitting unit 103 and the memory unit 104 and the carrying member 105. The housing 106 has a cleaning unit 1061 inside. As mentioned above, the housing 106 can confine the carrying member 105 to move partially in and out of the housing 106. In the present embodiment, the cleaning unit 1061 is a cloth. The material of the cloth should be soft enough so that when it moves across the surface of the image sensing unit 101, the surface won't be scratched. In practice, the cleaning unit 1061 can use a soft blade or brush instead. As shown in FIG. 4 and FIG. 5, it is obvious that the cleaning unit 1061 removes residual fingerprint from the image sensing unit 101 while the carrying member 105 moves in and out of the housing 106. That means the cleaning unit 1061 wipes out the residual fingerprint or dust on the image sensing unit 101. The housing 106 further has a first opening 1062 and a second opening 1063. The first opening 1062 is used for exposing the image sensing unit 101 while the carrying member 105 is pushed out of the housing 106. The second opening 1063 is used for the signal transmitting unit 103 to be pushed out of the housing 106.

In this embodiment, the portable fingerprint device 10 is a USB mass storage device. The portable fingerprint device 10 uses a USB male connector to transmit data and connect with the command device 20, which can be a notebook or desktop computer. According to the spirit of the present invention, the portable fingerprint device 10 is not limited to the USB drive mass storage device. It can be any device which has the image sensing unit 101 needed to be cleaned. The signal transmitting unit 103 can also be a wireless communication device such as a 2.4 Ghz or Bluetooth transmitting module instead.

From the aforementioned description, it is easily known how the portable fingerprint device 10 functions. When a user initiates the portable fingerprint device 10 by scanning his fingerprint by the image sensing unit 101, the fingerprint image data is sent to the microprocessor 102. The microprocessor 102 will identify the fingerprint image of the finger from the fingerprint database in the memory unit 104 to check if the fingerprint is registered or not. After receiving a command signal from the command device 20, the microprocessor 102 will act as the command signal requests. For example, the microprocessor 102 will allow user to use other data stored in the memory unit 104 according to the command signal. Finally, the microprocessor 102 requests the signal transmitting unit 103 to transmit the response signal back to the command device 20 to let the command device 20 know what has been done according to the command signal. The response signal includes a message that indicates whether the fingerprint image of the finger match a corresponding group fingerprints in the fingerprint database or not. The response signal is also a response of the command signal.

In order to facilitate use of the command device 20, the command device 20 has a software. The software can control the microprocessor 102 to perform functions based on the result of fingerprint identification via the command signal. For example, the microprocessor 102 may deliver user requested data stored in the memory unit 104 if the fingerprint identification result is positive, or transmit a response signal that includes a message indicating a failure of fingerprint match.

According to the present invention, it should be noticed that the command device 20 can be a notebook computer, a desktop computer, a mobile phone, or fingerprint secured door look.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A portable device having fingerprint recognition function, comprising:
   an image sensing unit, for capturing fingerprint images of a finger;
   a microprocessor, linked to the image sensing unit, for recording the fingerprint image of the finger, identifying the fingerprint image of the finger from a fingerprint database, receiving a command signal and transmitting a response signal;
   a signal transmitting unit, connected to the microprocessor, for transmitting the command signal and the response signal between the microprocessor and an external command device separated from the portable device,
   a carrying member, for carrying the image sensing unit, the microprocessor, and the signal transmitting unit; and
   a housing, for accommodating the image sensing unit, the microprocessor, and the signal transmitting unit and for confining the carrying member to move partially in and out of the housing,
   wherein the housing has a first opening for exposing the image sensing unit while the carrying member is pushed out of the housing;
   wherein the housing has a cleaning unit disposed away from the first opening for removing residual fingerprint from the image sensing unit while the carrying member moves in and out of the housing; and
   wherein the signal transmitting unit is protruded out of the housing when needed to be connected to the external command device and stowed back in the housing when not in use.

2. The portable device according to claim 1, further comprising:
   a memory unit, linked to the microprocessor, for storing the fingerprint database.

3. The portable device according to claim 1, wherein the cleaning unit is a cloth, soft blade or brush.

4. The portable device according to claim 1, wherein the external command device comprises a software for sending the command signal for the microprocessor to perform functions based on the result of the fingerprint identification.

5. The portable device according to claim 1, wherein the external command device is a notebook computer, a desktop computer, a mobile phone, or fingerprint secured door look.

6. The portable device according to claim 1, wherein the signal transmitting unit is a USB port or a wireless communication device such as a 2.4 Ghz or Bluetooth transmitting module.

7. The portable device according to claim 1, wherein the response signal is a response of the command signal.

8. The portable device according to claim 1, wherein the response signal comprises a message that indicates whether the fingerprint image of the finger match a corresponding record in the fingerprint database or not.

9. The portable device according to claim 1, wherein the housing comprises a second opening for the signal transmitting unit to be pushed out of the housing.

* * * * *